United States Patent [19]

Demus et al.

[11] Patent Number: 4,565,881
[45] Date of Patent: Jan. 21, 1986

[54] LIQUID CRYSTAL SUBSTITUTED 1,3-DIOXANES AND MIXTURES CONTAINING THEM

[75] Inventors: Dietrich Demus; Horst Zaschke, both of Halle; Hans-Matthias Vorbrodt, Quedlinburg; Horst Kresse; Wolfgang Weissflog, both of Halle, all of German Democratic Rep.

[73] Assignee: Veb Werk für Fernsehdektronik im Veb Kombinat Mikroelektronik, Berlin, Fed. Rep. of Germany

[21] Appl. No.: 405,677

[22] Filed: Aug. 6, 1982

Related U.S. Application Data

[63] Continuation-in-part of Ser. No. 102,944, Dec. 12, 1979, Pat. No. 4,348,324.

[30] Foreign Application Priority Data

Dec. 13, 1978 [DD] German Democratic Rep. ... 209708
Dec. 13, 1978 [DD] German Democratic Rep. ... 209707

[51] Int. Cl.$^4$ ............................................. C07D 319/06
[52] U.S. Cl. ..................................... 549/373; 549/374; 549/375
[58] Field of Search ......................................... 549/373

[56] References Cited

U.S. PATENT DOCUMENTS 4,322,354 3/1982 Sorkin ................................... 549/373
4,486,332 12/1984 Demus et al. ......................... 549/373

FOREIGN PATENT DOCUMENTS 139852 1/1980 Fed. Rep. of Germany ...... 549/374
2044767A 10/1980 United Kingdom ................ 549/373
2063288A 6/1981 United Kingdom ................ 549/373

Primary Examiner—Ethel G. Love
Attorney, Agent, or Firm—Jordan and Hamburg

[57] ABSTRACT

Liquid crystal substituted 1,3-dioxanes and mixtures containing the same.

The invention relates to liquid crystal substituted 1,3-dioxanes and substances containing the same, for electro-optical arrays for the modulation of incident or transmitted light as well as for the reproduction of figures, symbols and images.

The object of the invention is nematic liquid-crystal substances with favorable properties with respect to melting and clear points, stability toward thermal stress, effect of light, chemicals and electric fields as well as loss of color and processes for their production.

The object is accomplished by the creation of new nematic liquid-crystal substances.

According to the invention, liquid crystal 2,5-disubstituted derivatives of 1,3-dioxane of the general formula

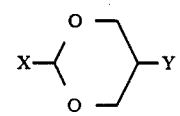

are proposed, wherein

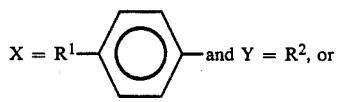

$X = R^1$—⌬—and $Y = R^2$, or

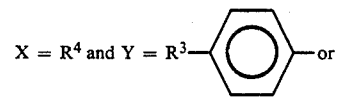

$X = R^4$ and $Y = R^3$—⌬—or

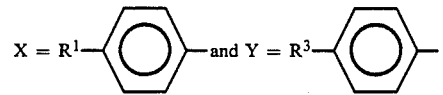

$X = R^1$—⌬—and $Y = R^3$—⌬—

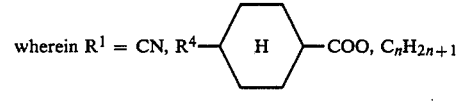

wherein $R^1 = CN$, $R^4$—H—COO, $C_nH_{2n+1}$

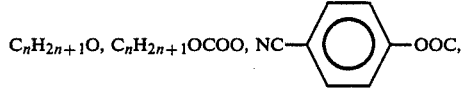

$C_nH_{2n+1}O$, $C_nH_{2n+1}OCOO$, NC—⌬—OOC,

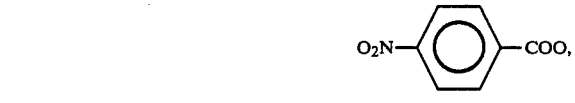

$O_2N$—⌬—COO, $R^2 = OR^4$, $C_nH_{2n+1}$,
$R^3 = Br$, $CN$, $C_nH_{2n+1}$, and
$R^4 = C_nH_{2n+1}$, with n = 1 to 10.

The new substances may be used in mixtures containing at least one of the substances according to the invention.

4 Claims, No Drawings

LIQUID CRYSTAL SUBSTITUTED 1,3-DIOXANES AND MIXTURES CONTAINING THEM

REFERENCE TO RELATED APPLICATION

This is a continuation-in-part of application Ser. No. 102,944, filed Dec. 12, 1979, now U.S. Pat. No. 4,348,324.

BACKGROUND OF THE INVENTION

The invention relates to liquid crystal substituted 1,3 dioxanes and substances containing the same, for electro-optical arrays for the modulation of transmitted or incident light, as well as for the reproduction of figures, symbols and images.

It is known that different electro-optical effects will occur in nematic liquid crystals due to the optical and dielectric anisotrophy of the latter, which can be utilized for the production of electro-optical components (G. Meier, E. Sackmann, J. G. Grabmaier, Applications of Liquid Crystals, Springer Verlag, Heidelberg-Berlin-New York 1975; M. Tobias, International Handbook of Liquid Crystal Displays 1975–76, Ovum Ltd., London 1976.)

Components of the basis of the twisted nematic strata are of particular interest herein, where their twist may be cancelled under the influence of the electric field as a consequence of which effects of brightness-darkness will occur. A precondition for such components is the use of nematic substances with positive dielectric anisotrophy found in compounds with a strong longitudinal component of the dipole moment. The dynamic scattering effect will occur in substances with negative dielectric anisotropy and is also suitable for electro-optical components.

The substances hitherto used for electro-optical components all have certain disadvantages, consisting of too high a melting point or too low a clarification point, or of a limited stability toward thermal stress, the effect of light and chemicals as well as of electric fields or a deleterious self-coloration.

The object of the invention is nematic liquid crystal substances with favorable properties relative to melting and clear points, stability towards thermal stress, effects of light and chemicals as well as electric fields, as well as processes for their production.

According to the invention, this task is resolved by the creation of new nematic liquid crystal substances and processes for their synthesis, not previously known.

SUMMARY OF THE INVENTION

It has been found that liquid crystal 2,5 disubstituted derivatives of 1,3 dioxanes of the general formula

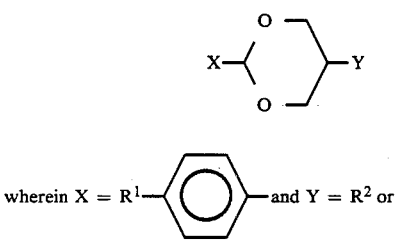

wherein X = R$^1$—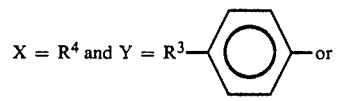—and Y = R$^2$ or

X = R$^4$ and Y = R$^3$—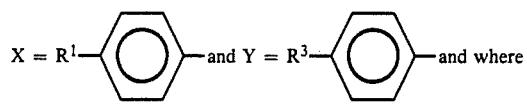—or

X = R$^1$—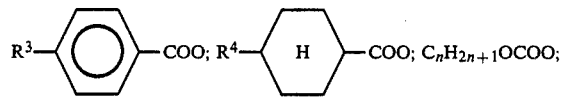—and Y = R$^3$—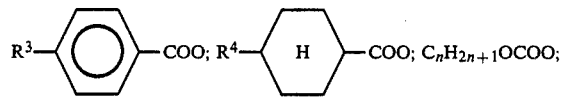—and where

R$^1$ = C$_n$H$_{2n+1}$; C$_n$H$_{2n+1}$O; C$_n$H$_{2n+1}$COO;

R$^3$—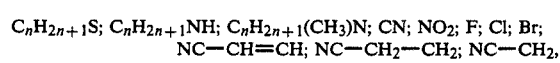—COO; R$^4$—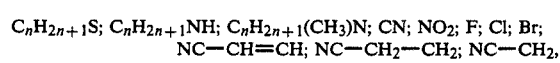—COO; C$_n$H$_{2n+1}$OCOO;

C$_n$H$_{2n+1}$S; C$_n$H$_{2n+1}$NH; C$_n$H$_{2n+1}$(CH$_3$)N; CN; NO$_2$; F; Cl; Br; NC—CH=CH; NC—CH$_2$—CH$_2$; NC—CH$_2$,

R$^2$ = C$_n$H$_{2n+1}$; OH; CN; OR$^4$; OCOR$^4$; OCOOR$^4$;

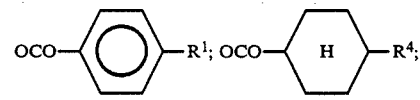

R$^3$ = C$_n$H$_{2n+1}$; C$_n$H$_{2n+1}$O; Cl; Br; CN; NO$_2$;
R$^4$ = C$_n$H$_{2n+1}$; and wherein
n = 1 to 10, can be produced by the reaction of alkanals, substituted benzaldehydes or their acetals with glycerine or 2-substituted-(1,3)-propanediols, in organic solvents and in the presence of an acidic catalyst, according to the general scheme:

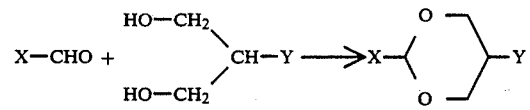

with, in given instances, subsequent esterification or etherification.

The present invention is especially directed to compounds and compositions of the above formula, wherein R$^1$ = CN, R$^4$—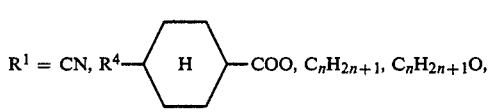—COO, C$_n$H$_{2n+1}$, C$_n$H$_{2n+1}$O, C$_n$H$_{2n+1}$OCOO, NC—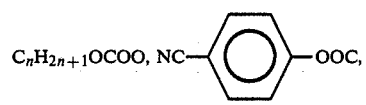—OOC, O$_2$N—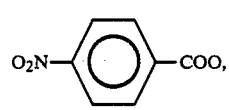—COO, R$^2$ = OR$^4$, C$_n$H$_{2n+1}$,
R$^3$ = Br, CN, C$_n$H$_{2n+1}$, and
R$^4$ = C$_n$H$_{2n+1}$ with n = 1 to 10.

DETAILED DESCRIPTION OF PREFERRED EMBODIMENTS

According to the invention, the new compounds are used in mixtures having as a constituent at least one of these substances of the invention. The substances of the invention are of particular advantage in mixtures consisting of themselves or in mixtures with other liquid crystal or non-liquid crystal substances.

The advantages of the substances of the invention reside in the low melting points with adequately high clear points, and in their stability toward the effects of heat, light, chemicals and electric fields.

The substances with three rings possess the most favorable properties for a considerable rise of the clear point of mixtures.

The invention is to be explained below in more detail and with the aid of seven embodiments.

EXAMPLE 1

Production of 2-alkyl-(1,3)-propanediols (see Tab. 1) and of 2-[4-subst.-phenyl]-(1,3)-propanediols (see Tab. 2)

21 g (0.5 mol) LiAlH$_4$ in 1 l. abs. ether is first prepared in a 2 l. three-neck flask. Under cooling with ice and strong agitation, 1 mol n-alkylmalonester or 1 mol 4-subst.-phenylmalonester which is mixed with the identical volume of abs. ether is slowly added and agitation at room temperature is continued for another 2 hours. The mixture is subsequently carefully diluted with 100 ml ice water. The resulting precipitate (Al(OH)$_3$, LiOH) is dissolved by the addition of 700 ml. of 10% strength H$_2$SO$_4$. The organic phase is separated, the aqueous phase de-ethered twice and the combined organic phases eluted with a 2% solution of NaHCO$_3$ and water. After drying with Na$_2$SO$_4$ the solvent is distilled off under vacuum and the residue is subjected to fractional distillation. Embodiments are found in Tab. 1 and 2.

TABLE 1

$C_nH_{2n+1}$—CH(CH$_2$OH)$_2$

| n | Yield (%) | Boiling Point (°C.)/mm Hg |
|---|---|---|
| 3 | 63 | 92–93/2.5 |
| 4 | 69 | 107–110/2 |
| 5 | 65 | 125–126/2.5 |
| 6 | 73 | 133–136/2.5 |
| 7 | 75 | S: 28–30 Petrol ether |
| 8 | 74 | S: 44–46 Petrol ether |

S = solidification point

TABLE 2

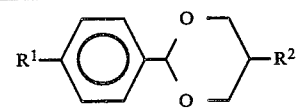

| R | Yield % | S (°C.) |
|---|---|---|
| C$_6$H$_{13}$ | 75 | 72–74 |
| C$_4$H$_9$O | 89 | 70–72 |

EXAMPLE 2

Production of the compounds 1,2,3

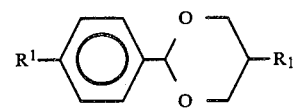

1

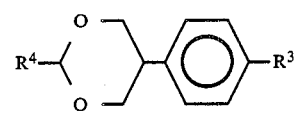

2

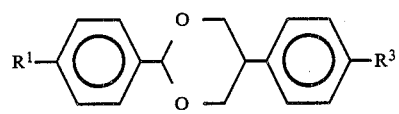

3

0.1 mol alkanal or 0.1 mol substituted benzaldehyde or their acetals and 0.11 mol 2-alkyl-(1,3)-propanediol or 0.12 mol glycerin or 0.11 mol 2-[4-subst.-phenyl]-(1,3)-propanediol are heated with agitation, with the separation of water until the conclusion of the reaction, in 150 ml. abs. benzene, chloroform, methylene chloride, carbon tetrachloride or toluene, in the presence of 100 mg p-toluene sulfonic acid or AlCl$_3$, SbCl$_4$, TiCl$_4$ or 2 ml. of a mineral acid (HCl, H$_2$SO$_4$, H$_3$PO$_4$). After the constitutents of the reaction have cooled down, they are eluted with a 2% solution of NaHCO$_3$ and water, and dried over Na$_2$SO$_4$. The solvent is distilled-off at the rotating evaporator and the residue recrystallized from methanol. The yield is approx. 80–100% of the theoretical value.

In the tables, identification is made as follows: K=solid crystalline, S, S$_A$, S$_B$=smectic A or B respectively, N=nematic, I=isotropic liquid.

TABLE 3

| Compound | R$^1$ | R$^2$ | K | S$_A$ | N | I |
|---|---|---|---|---|---|---|
| 1.1 | HO | C$_7$H$_{15}$ | .107–109 | — | — | . |
| 1.2 | C$_4$H$_9$ | C$_3$H$_7$ | . | S$_B$26 | — | . |
| 1.3 | C$_3$H$_7$O | C$_4$H$_9$ | .43 | — | (.25) | . |
| 1.4 | C$_4$H$_9$O | C$_4$H$_9$ | .44 | — | (.40) | . |
| 1.5 | C$_5$H$_{11}$O | C$_4$H$_9$ | .49 | — | (.35.5) | . |
| 1.6 | C$_6$H$_{13}$O | C$_4$H$_9$ | .31 | — | (.43) | . |
| 1.7 | C$_7$H$_{15}$O | C$_4$H$_9$ | .45 | — | (.41.5) | . |
| 1.8 | C$_9$H$_{19}$O | C$_4$H$_9$ | .47 | — | (.45) | . |
| 1.9 | CN | C$_4$H$_9$ | .42 | — | (.35.5) | . |
| 1.10 | C$_3$H$_7$O | C$_5$H$_{11}$ | .37.5 | (.28.5) | .40.5 | . |
| 1.11 | C$_4$H$_9$O | C$_5$H$_{11}$ | .40 | — | .53 | . |
| 1.12 | C$_5$H$_{11}$O | C$_5$H$_{11}$ | .38 | (.29) | .50.5 | . |
| 1.13 | C$_6$H$_{13}$O | C$_5$H$_{11}$ | .44 | (.22) | .56 | . |
| 1.14 | C$_7$H$_{15}$O | C$_5$H$_{11}$ | .45 | (.34) | .55 | . |
| 1.15 | C$_9$H$_{19}$O | C$_5$H$_{11}$ | .48 | (.41) | .56.5 | . |
| 1.16 | CN | C$_5$H$_{11}$ | .55 | — | (.48) | . |
| 1.17 | C$_3$H$_7$ | C$_6$H$_{13}$ | .35 | S$_B$41 | — | . |
| 1.18 | C$_4$H$_9$ | C$_6$H$_{13}$ | .32 | S$_B$40.5 | — | . |
| 1.19 | C$_6$H$_{13}$ | C$_6$H$_{13}$ | .36.5 | .38.5 | — | . |
| 1.20 | C$_3$H$_7$O | C$_6$H$_{13}$ | .40 | .44.5 | (.48) | . |
| 1.21 | C$_4$H$_9$O | C$_6$H$_{13}$ | .35.5 | .44 | .50 | . |
| 1.22 | C$_5$H$_{11}$O | C$_6$H$_{13}$ | .37 | .46 | .49 | . |
| 1.23 | C$_6$H$_{13}$O | C$_6$H$_{13}$ | .34 | .45 | .53 | . |
| 1.24 | C$_7$H$_{15}$O | C$_6$H$_{13}$ | .45 | .50.5 | .55 | . |
| 1.25 | C$_9$H$_{19}$O | C$_6$H$_{13}$ | .48 | .53.5 | .56.5 | . |
| 1.26 | Br | C$_6$H$_{13}$ | .56 | (.39) | — | . |
| 1.27 | NO$_2$ | C$_6$H$_{13}$ | .56 | — | — | . |
| 1.28 | CN | C$_6$H$_{13}$ | .47 | — | (.40.5) | . |

TABLE 3-continued $$R^1-\bigcirc-\underset{O}{\overset{O}{\diagup}}-R^2$$

| Compound | R$^1$ | R$^2$ | K | S$_A$ | N | I |
|---|---|---|---|---|---|---|
| 1.29 | C$_4$H$_9$O | C$_7$H$_{15}$ | .49 | .59.5 | — | . |
| 1.30 | C$_6$H$_{13}$O | C$_7$H$_{15}$ | .37.5 | .62 | — | . |
| 1.31 | CN | C$_7$H$_{15}$ | .54 | — | (.52) | . |
| 1.32 | C$_6$H$_{13}$ | C$_8$H$_{17}$ | .38 | .60 | — | . |
| 1.33 | C$_2$H$_5$O | C$_8$H$_{17}$ | .55 | — | (.55) | . |
| 1.34 | C$_4$H$_9$ | C$_8$H$_{17}$ | .43 | .62 | — | . |
| 1.35 | C$_5$H$_{11}$O | C$_8$H$_{17}$ | .38 | .60 | — | . |
| 1.36 | Br | C$_8$H$_{17}$ | .48.5 | (.44.5) | — | . |
| 1.37 | CN | C$_8$H$_{17}$ | .60 | — | (.51) | . |

TABLE 4

$$R^4-\underset{O}{\overset{O}{\diagup}}-\bigcirc-R^3$$

| Compound | R$_4$ | R$_3$ | K | S$_B$ | N | I |
|---|---|---|---|---|---|---|
| 2.1 | C$_3$H$_7$ | C$_4$H$_9$O | | .26 | — | . |
| 2.2 | C$_6$H$_{13}$ | C$_4$H$_9$O | .44 | .50 | — | . |

TABLE 5

$$R^1-\bigcirc-\underset{O}{\overset{O}{\diagup}}-\bigcirc-R^3$$

| Compound | R$^1$ | R$^3$ | K | S | S$_B$ | N | I |
|---|---|---|---|---|---|---|---|
| 3.1 | C$_6$H$_{13}$O | C$_4$H$_9$O | .136 | (.124) | .166 | — | . |
| 3.2 | CN | C$_4$H$_9$O | .121 | — | — | .202 | . |
| 3.3 | CN | CN | .83 | — | — | .152 | . |

TABLE 6

$$X = R^1-\bigcirc- \quad Y = R^3-\bigcirc-$$

$$R^1-\bigcirc-\underset{O}{\overset{O}{\diagup}}-\bigcirc-R^3$$

| Compound | R$^1$ | R$^3$ | K | S | N | I |
|---|---|---|---|---|---|---|
| 3.4 | NC— | —C$_6$H$_{13}$ | .83 | — | .154 | . |
| 3.5 | C$_3$H$_7$O— | —Br | .153 | .196 | — | . |
| 3.6 | C$_3$H$_7$O— | —CN | .151 | — | .221 | . |
| 3.7 | NC— | —C$_5$H$_{11}$ | .110 | — | .165 | . |
| 3.8 | NC— | —C$_5$H$_7$ | .128 | — | .180 | . |
| 3.9 | NC— | —CH$_3$ | .171 | — | .202 | . |

EXAMPLE 3

Three processes for the esterification of 2-[4-hydroxyphenyl]-5-alkyl-1,3-dioxane are as follows:

1. 0.1 mol 2-[4-hydroxy-phenyl]-5-alkyl-1,3-dioxane is dissolved in 50 m abs. tetrahydrofuran and diluted with 0.12 mol sodium-hydride. After agitation for two hours, 0.12 mol of the requisite alkyl bromide is added and the mixture of the reaction is heated under reflux for 4 hours. The solvent is then distilled off at the rotary evaporator, the product of the reaction absorbed in 100 ml ether and the etheric phase eluted twice with 100 ml water. Drying over Na$_2$SO$_4$ is subsequently accomplished, the solvent distilled off at the residue recrystallized from methanol. (Tab. 7)

2. 0.1 mol 2-[4-hydroxy-phenyl]-5-alkyl-1,3-dioxane is dissolved in a small quantity of benzene and added to a suspension of 0.23 g (0.1 g-atom) sodium in 100 ml abs. toluene. After heating to 80° C. for three hours, cooling is accomplished to room temperature and 0.11 mol alkyl bromide is added. Heating is effected to 80° C. for three hours, followed by cooling down to room temperature thereafter, and 0.11 mol alkyl bromide is added. Subsequently, heating to 80° C. is effected for four hours and the constituents of the reaction are eluted with water thereafter. Drying is accomplished over Na$_2$SO$_4$, the solvent is distilled off and the product of the reaction is crystallized (Tab. 7).

3. 0.1 mol 2-[4-hydroxy-phenyl]-5-alkyl-1,3-dioxane is introduced under stirring into the solution of 0.23 g (0.1 g atom) sodium in 100 ml abs. of ethanol. 0.1 mol alkyl bromide is then added and the composition heated for four hours at reflux. After the solvent has been distilled off, the residue is absorbed in ether, eluted, and dried over Na$_2$SO$_4$. The ether is distilled off and the product of the reaction is recrystallized from methanol (Tab. 7).

TABLE 7

$$R^1-\bigcirc-\underset{O}{\overset{O}{\diagup}}-R^2$$

| Compound | R$^1$ | R$^2$ | Yield according to process no. (%) 1 | 2 | 3 | K | S$_A$ | N | I |
|---|---|---|---|---|---|---|---|---|---|
| 1.4 | C$_4$H$_9$O | C$_4$H$_9$ | 95 | 83 | 85 | .44 | — | (.40) | . |
| 1.13 | C$_6$H$_{13}$O | C$_5$H$_{11}$ | 93 | — | 71 | .44 | (.22) | .56 | . |
| 1.24 | C$_7$H$_{15}$O | C$_6$H$_{13}$ | 96 | 75 | 78 | .45 | .50.5 | .55 | . |

EXAMPLE 4

2 processes for the esterification of 2-[4-hydroxy-phenyl]-5-subst.-1,3-dioxane and 2-[4-subst.-phenyl]-5-hydroxy-1,3-dioxanes 1. The sodium salt of 0.1 mol 2-[4-hydroxy-phenyl]-5-subst.-1,3-dioxanes (produced according to Example 3), is reacted under stirring, in 50 ml abs. tetrahydrofuran, ether, benzene, or toluene, with 0.15 mol of the requisite acid chloride. These constituents are left standing overnight, the solvent distilled off, the residue absorbed in ether, eluted, dried with Na$_2$SO$_4$ and recrystallized from methanol. The yield amounts to 90–95% of the theoretical value.

2. 0.1 mol 2-[4-hydroxy-phenyl] 5 subst.-1,3-dioxane or 0.1 mol 2-[4-subst.-phenyl] 5-hydroxy-1,3-dioxane are dissolved in 15 ml abs. pyridine and 0.11 mol of a requisite acid chloride is slowly added under cooling and agitation. The mixture of the reaction is left standing overnight and the residue is worked up as described under 1. The yield is 90% of theoretical.

TABLE 8

R—COO—⌬—CH(O—CH₂—CH(R³)—CH₂—O)

| Compound | R | R³ | K | | | N | I |
|---|---|---|---|---|---|---|---|
| 1.38 | C₄H₉ | C₇H₁₅ | .34 | S_B | 68 | — | . |
| 1.39 | C₅H₁₁O | C₇H₁₅ | .27 | S_A | 30 | .42 | . |
| 1.40 | C₆H₁₃—⌬— | C₇H₁₅ | .80.5 | — | — | .148.5 | . |
| 1.41 | CH₃O—⌬— | C₇H₁₅ | .85 | — | — | .193 | . |
| 1.42 | C₅H₁₁O—⌬— | C₇H₁₅ | .103 | — | — | .174 | . |
| 1.43 | CF₃—⌬— | C₇H₁₅ | .113 | S_A | 166.5 | — | . |
| 1.44 | NC—⌬— | C₇H₁₅ | .129 | S_A | 182.5 | .221 | . |

TABLE 9

R¹—⌬—CH(O—CH₂—CH(R²)—CH₂—O)

| Compound | R¹ | R² | K | S | N | I |
|---|---|---|---|---|---|---|
| 1.45 | NO₂ | —OOC—⌬—OC₆H₁₃ | .143 | — | .159 | . |
| 1.46 | C₆H₁₃O | —OOC—⌬—NO₂ | .132 | — | — | . |

TABLE 10

R¹—⌬—CH(O—CH₂—CH(R²)—CH₂—O)

| CMPD. | R¹ | R² | K | S^A | N | I |
|---|---|---|---|---|---|---|
| 1.47 | NC— | C₂H₅ | . 65.8 | — — | — | . |
| 1.48 | NC— | C₃H₇ | . 58.3 | — — | (. 43.8) | . |
| 1.49 | NC— | C₉H₁₉ | . 65 | — — | (. 58) | . |
| 1.50 | NC— | C₁₁H₂₃ | . 74 | — — | (. 62) | . |
| 1.51 | NC— | —OC₁₆H₃₃ | . 78–8C | — — | — | . |
| 1.52 | C₇H₁₅— | —C₇H₁₅ | . 47 | S_B 51 | — — | . |
| 1.53 | C₆H₁₃— | —C₇H₁₅ | . 34 | S_B 38 | — — | . |
| 1.54 | C₇H₁₅O— | —C₇H₁₅ | . 48 | S_B 51 | — — | . |
| 1.55 | C₅H₁₁OCOO— | —C₇H₁₅ | . 27 | S_A 30 | . 42 | . |
| 1.56 | C₇H₁₅O— | —OC₁₆H₃₃ | K 51 | (S 51) S_B | 68 | I |

TABLE 11

X = R¹—⌬—Y = R²

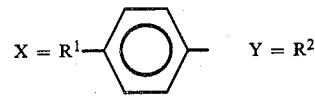

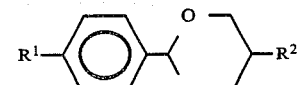

| CMPD. | R¹ | R² | K | S | N | I |
|---|---|---|---|---|---|---|
| 1.57 | C₅H₁₁—⟨H⟩—COO | C₃H₇ | .92 | — | .177.5 | . |
| 1.58 | NC—⌬—OOC | C₆H₁₃ | .135 | — | .190 | . |
| 1.59 | NC—⌬—OOC | C₇H₁₅ | .138 | — | .210 | . |
| 1.60 | NC—⌬—OOC | C₈H₁₇ | . | .177 | .194 | . |
| 1.61 | O₂N—⌬—COO | C₇H₁₅ | .143 | .205 | — | . |

EXAMPLE 5

Procedure for the synthesis of 5-alkyl-2-[4-(β-cyanoethyloxy)-phenyl]-1,3-dioxane and 5-[β-cyanoethyloxy]-2-[4-subst.-phenyl]-1,3-dioxane.

To a solution of 0.1 mol 5-alkyl-2-[4-hydroxyphenyl]-1,3-dioxane, or 0.1 mol 2-[4-subst-phenyl]-5-hydroxyl-1,3-dioxane, 300 mg sodium methylate and 0.12 mol acrylonitrile are added at 35° to 40° C. The constituents of the reaction are stirred for 6 hours at room temperature and subsequent extraction is accomplished with ether.

The etheric phase is eluted, dried with potash and the solvent distilled off. The residue is crystallized from methanol. The yield is 54–80% of the theoretical quantity.

EXAMPLE 6

5-n-hexyl-2-[4-cyano-phenyl]-1,3-dioxane (Compound No. 1.30) is suitable for electro-optical components based on twisted nematic strata and has the following indicators:
measuring temperature: 35° C.
threshold voltage: 0.65 V/50 Hz
onset time $t_E$ (50%)=376 ms at U=1.3 V/50 Hz
delay time $t_A$ (50%)=190 ms, stratum thickness μm
EXAMPLE 7
The substance No. 1.33 (Tab. 3) has a strong DK anistrophy of Δε=+11, at 10° C. below the clear point.
We claim:
1. The compound
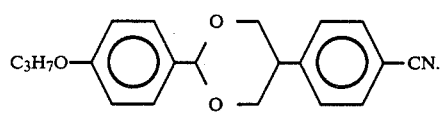
2. The compound
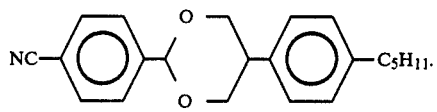
3. The compound
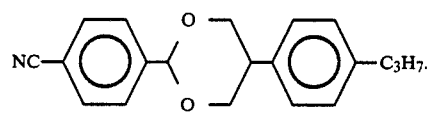
4. The compound
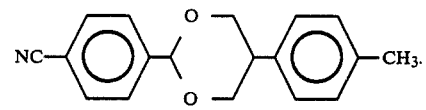
* * * * *

UNITED STATES PATENT AND TRADEMARK OFFICE
CERTIFICATE OF CORRECTION

PATENT NO. : 4,565,881
DATED : January 21, 1986
INVENTOR(S) : Dietrich Demus et al It is certified that error appears in the above-identified patent and that said Letters Patent are hereby corrected as shown below:

On the title page

In the Assignee, i.e., Item "[73]", change both occurrences of "Veb" to --VEB-- and change "Fed. Rep. of Germany" to --German Democratic Rep.--.

Under "References Cited", "FOREIGN PATENT DOCUMENTS", regarding foreign patent document 139852 change the country from "Fed. Rep. of Germany" to --German Democratic Rep.--.

Signed and Sealed this

Fourteenth Day of October, 1986

[SEAL]

*Attest:*

DONALD J. QUIGG

*Attesting Officer*     *Commissioner of Patents and Trademarks*